ARRANGEMENT FOR STABILIZING THE RECTIFIED OUTPUT
VOLTAGE PULSES OF A TRANSFORMER

Filed June 26, 1968

INVENTORS
ROBERT SCHIMKE
MANFRED STRAHLE

BY [signature]

ATTORNEY

United States Patent Office 3,530,363

Patented Sept. 22, 1970

3,530,363

ARRANGEMENT FOR STABILIZING THE RECTIFIED OUTPUT VOLTAGE PULSES OF A TRANSFORMER

Robert Schimke, Zell, and Manfred Strähle, Nellingen, Germany, assignors to International Standard Electric Corporation, New York, N.Y., a corporation of Delaware

Filed June 26, 1968, Ser. No. 740,137
Claims priority, application Germany, July 1, 1967, 1,588,844
**Int. Cl. H02m *1/08*; H03k *3/16***
U.S. Cl. 321—16 6 Claims

ABSTRACT OF THE DISCLOSURE

In a circuit arrangement for stabilizing a D.C. voltage derived from rectifying pulses provided by a transformer, current fed through the primary is turned on and off by a transistor controlled by pulses from a square wave generator. The primary is shunted by a capacitor and a diode. When the transistor is turned off, a high potential pulse is developed across the primary which appears in the secondary and is then rectified and applied to a load. To control the output voltage under varying load conditions the current through the secondary is used to produce a voltage drop across a resistor shunted by a capacitor and this voltage drop is applied to control the frequency of the square wave generator, thereby changing the amplitude of the output pulses and the resulting output voltage.

BACKGROUND OF THE INVENTION

The invention relates to a circuit arrangement used for stabilizing a very high D.C. voltage, loaded by a variable load, said D.C. voltage being produced by rectification of high voltage pulses produced at the output of a transformer. A substantially constant voltage of frequency $f$ having a time duration $t$ is periodically applied to the primary of said transformer so that during said period of time the magnetic flux in the transformer increases linearly, and during the time said nearly constant voltage is not applied, these high voltage pulses are produced.

It is well known in television receivers to insert in parallel with the picture tube a ballast tube (triode) for keeping the high voltage constant, the grid voltage of said triode depending on the cathode-ray or beam current. When the beam current is diminishing the ballast tube draws an increasing amount of current so that the transformer is always operating with a constant load. This solution is relatively expensive, requires much space, and has the disadvantage that X-rays occur in said ballast tube so that the tube must be well shielded. It is also well known in the art to vary or modify the grid bias of the output tube in a manner dependent on the load current, via a control circuit in color television receivers having separate high voltage generating circuits, said high voltage remaining constant if the load current varies.

This latter type of control is not feasible with transistorized output stages driving a cathode-ray tube because only an entirely conductive or non-conductive condition is feasible with transistors.

SUMMARY OF THE INVENTION

It is therefore an object of the present invention to provide a circuit arrangement for stabilizing the rectified high voltage output of a high voltage transformer, said arrangement not requiring a ballast tube.

It is a feature of this invention to provide such an arrangement using a transistorized output stage to drive the cathode-ray tube.

According to the broader aspects of the invention I have provided a source applying a substantially constant voltage for a time $t$ having a frequency $f$ to the primary of a transformer, means connected to the secondary of said transformer for rectifying the high voltage pulses provided at the output of said transformer during the periods when said substantially constant voltage is not applied to the primary, and means connected between said transformer and said source responsive to the amplitude of said rectified voltage for controlling said source so as to vary said time $t$, thereby varying the magnitude of the pulses produced at the secondary of the transformer.

Further objects and features of this invention will become more apparent by reference to the following description taken in conjunction with the accompanying drawings, in which:

DESCRIPTION OF THE PREFERRED EMBODIMENT

Figure 1:
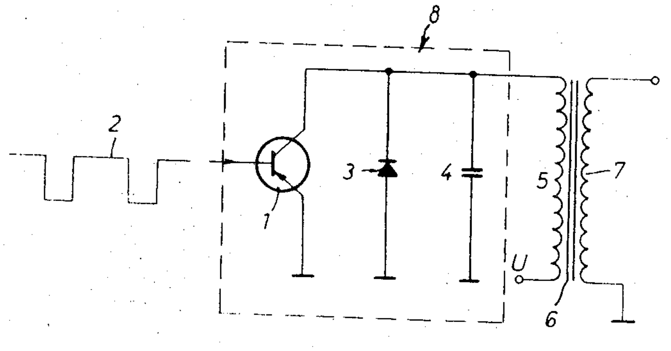
FIG. 1 shows a known circuit arrangement for obtaining high voltage pulses at the output of a transformer.
Figure 3:
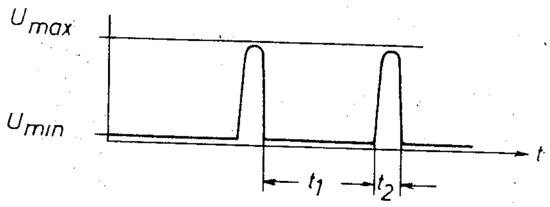
FIG. 3 is a graphical representation of the voltage appearing at various points of FIGS. 1 and 2.
Figure 2:
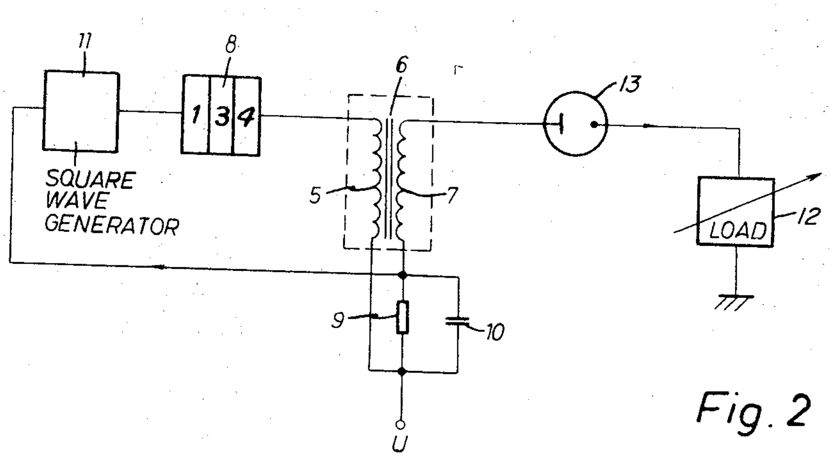
FIG. 2 is a circuit diagram of a preferred embodiment of the invention.

Referring to FIG. 2 there is shown an arrangement for stabilizing the rectified output voltage of a transformer according to the invention. Such an arrangement includes a transistor 1, diode 3 and capacitor 4 as represented by block 8 and shown schemically in FIG. 1, driven by a square wave generator 11 of frequency $f$ and connected to the high side of primary winding 5 of transformer 6. A square wave generator driving the combination of block 8 and transformer 6, as shown in FIG. 1, is well known in the art as a blocking oscillator and its operation is also well known. It is well known that the voltage waveshape appearing at the high side of the primary winding of the transformer will be shown in FIG. 3, and it is also well known to rectify, with a rectifier 13, the pulses appearing at the secondary of the transformer to provide very high D.C. voltage to a load 12, which load may vary with time.

In order to maintain stable the current drawn by the load, regardless of load variations, a resistance 9 connected in shunt with a capacitor 10 is connected between the low side of the transformer secondary 7 and the supply potential U of the arrangement. The junction of the parallel combination and the supply voltage is connected to the low side of the primary winding 5, and the junction of the parallel combination and the low side of secondary 7 is further connected to said square wave generator 11, said generator being of the type wherein its output frequency is a function of the amplitude of its input voltage.

In this arrangement the voltage drop across the RC combination is in proportion to the load current furnished to the load and the total voltage, consisting of the supply voltage U and the voltage drop, controls the square wave generator so as to vary the frequency $f$ of its output. As is understood from the circuit of FIG. 1, varying the frequency of the control voltage to the transistor 1 will vary the magnitude of the pulses appearing across the primary winding 5 of transformer 7, thereby, of course, varying the magnitude of the D.C. voltage provided to the load. It should further be noted that this circuit arrangement will also maintain the output D.C. voltage constant regardless of variations in the supply voltage U. If no fluctuations in said supply voltage must be taken into consideration, the RC combination may be inserted between the low end of the transformer 6 and ground.

We claim:

1. An arrangement for stabilizing the rectified output voltage pulses of a transformer comprising:

a transformer providing said output pulses;

a source providing pulses of substantially constant amplitude to the primary of said transformer, said source pulses having a duration *t*;

means connected to the secondary of said transformer rectifying the output pulses from said transformer for providing a D.C. voltage corresponding to the amplitude of said output pulses, said transformer providing said output pulses during the absence of said source pulses; and control means connected between the transformer and said source for controlling said source so as to vary the time *t*, thereby varying the amplitude of said output pulses.

2. An arrangement for stabilizing the rectified output voltage pulses of a transformer according to claim 1 wherein said control means is further connected between said transformer and a reference potential.

3. An arrangement for stabilizing the rectified output voltage pulses of a transformer according to claim 2 wnerein said reference potential is the supply voltage of the arrangement so that fluctuations in said supply voltage are compensated.

4. An arrangement for stabilizing the rectified output voltage pulses of a transformer according to claim 1 wherein said source includes a pulse generator.

5. An arrangement for stabilizing the rectified output voltage pulses of a transformer according to claim 4 wherein the frequency of the output of said pulse generator is a function of the amplitude of the input voltage applied to said generator.

6. An arrangement for stabilizing the rectified output voltage pulses of a transformer according to claim 5 wherein said control means includes a resistor shunted by a capacitor connected between said transformr and said pulse generator for controlling the amplitude of the input voltage provided to said generator.

References Cited

UNITED STATES PATENTS

| | | | |
|---|---|---|---|
| 2,854,614 | 9/1958 | Light | 321—2 |
| 2,881,380 | 4/1959 | Kruger | 321—18 XR |
| 2,886,706 | 5/1959 | Rogers | 331—148 XR |
| 3,001,125 | 9/1961 | Jensen | 321—2 XR |
| 3,051,888 | 8/1962 | Kroner | 321—2 |
| 3,117,270 | 1/1964 | Tailleur | 321—2 |
| 3,133,208 | 5/1964 | Lentz | 331—112 XR |
| 3,381,165 | 4/1968 | Taylor | 321—2 XR |

WILLIAM M. SHOOP, Jr., Primary Examiner

U.S. Cl. X.R.

331—112, 149